United States Patent
Merritt, Jr. et al.

(10) Patent No.: US 6,950,249 B2
(45) Date of Patent: Sep. 27, 2005

(54) PRECISION Z-AXIS MOUNT FOR A LENS ASSEMBLY IN AN OPTICAL INSPECTION APPARATUS

(75) Inventors: Edward J. Merritt, Jr., Caledonia, NY (US); Boris Gelman, Fairport, NY (US)

(73) Assignee: Optical Gaging Products, Inc., Rochester, NY (US)

( * ) Notice: Subject to any disclaimer, the term of this patent is extended or adjusted under 35 U.S.C. 154(b) by 5 days.

(21) Appl. No.: 10/628,945

(22) Filed: Jul. 30, 2003

(65) Prior Publication Data

US 2005/0024751 A1 Feb. 3, 2005

(51) Int. Cl.⁷ ................................................. G20B 7/02
(52) U.S. Cl. ........................................ 359/819; 359/821
(58) Field of Search ................................. 359/811, 819, 359/821, 822

(56) References Cited

U.S. PATENT DOCUMENTS 5,668,665 A    9/1997  Choate ........................ 359/663
5,828,502 A  * 10/1998  Afshari ....................... 359/819

OTHER PUBLICATIONS

Yabe, Shiroji, "Development of NSK Linear Guides", Motion & Control No. 5 –1998, pp. 9–18.

* cited by examiner

Primary Examiner—Hung Xuan Dang
Assistant Examiner—Joseph Martinez
(74) Attorney, Agent, or Firm—Shlesinger & Fitzsimmons

(57) ABSTRACT

A Z-axis assembly for an optical inspection apparatus, comprises a base; first and second parallel rails secured to the base; a plurality of carriages supported by ball bearings for translatory movement parallel to the Z-axis on each of the first and second rails; the carriages having a line of travel through the ball bearings in contact with their respective rails; a support structure secured to the carriages; and a lens assembly secured to the support structure such to be movable parallel to the Z-axis, the lens assembly including an optical axis parallel to the Z-axis and the lines of travel, and optical axis and the lines of travel lie on a common plane.

19 Claims, 4 Drawing Sheets

PRECISION Z-AXIS MOUNT FOR A LENS ASSEMBLY IN AN OPTICAL INSPECTION APPARATUS

FIELD OF THE INVENTION

The present invention relates generally to an optical inspection system and particularly to a Z-axis mount for a lens assembly in an optical inspection system.

BACKGROUND OF THE INVENTION

In a typical optical inspection apparatus used for performing precision measurements, the optical system is typically suspended above the object being measured and is adjustable in the Z-axis direction (vertical) while the object is supported on an X, Y axis mechanical stage, where precise control of the X, Y, Z axes facilitates the measurement process. An example of such a system is disclosed in U.S. Pat. No. 5,668,665.

There are a number of geometric error components associated with a measurement machine's total volumetric error. For example, there are three translations and three angular errors (pitch, roll and yaw) for each axis and three squareness errors, one for each axis. The errors associated with the Z-axis (vertical axis) also have a compounding effect on the other axes. The Z-axis pitch error manifests itself as a translation error in the Y-axis measurement. The Z-axis yaw error manifests itself as a translation error in the X-axis measurement. The Z-axis roll error compounds the problem further by manifesting itself into both a X-axis and a Y-axis translation error. Adding the zoom lens into the error equation, the higher the magnification, the higher the translation error for the same angular error.

There is, therefore, a need for a Z-axis mount for a lens assembly in an optical inspection system that reduces the errors typically associated with the Z-axis.

OBJECTS AND SUMMARY OF THE INVENTION

It is an object of the present invention to provide a Z-axis mount for a lens assembly in an optical inspection apparatus that reduces the translation and angular errors typically associated with the Z-axis.

It is another object of the present invention to provide a Z-axis mount for a lens assembly in an optical inspection apparatus that reduces the amplification of an angular error manifesting itself in a linear form via a lever arm, generally referred to as a sine error.

It is still another object of the present invention to provide a Z-axis mount for a lens assembly in an optical inspection apparatus that places the optical axis of the lens assembly co-planar and parallel with the line of travel of the carriages that move the lens assembly along the Z-axis.

It is another object of the present invention to provide a Z-axis mount for a lens assembly in an optical inspection apparatus that provides a structure that carries the lens assembly in a stiff box structure with minimal mass to stiffness ratio.

In summary, the present invention provides a Z-axis assembly for an optical inspection apparatus, comprising a base; first and second parallel rails secured to the base; a plurality of carriages supported by ball bearings for translatory movement parallel to the Z-axis on each of the first and second rails; the carriages having a line of travel through the ball bearings in contact with their respective rails; a support structure secured to the carriages; and a lens assembly secured to the support structure such to be movable parallel to the Z-axis, the lens assembly including an optical axis parallel to the Z-axis and the lines of travel, and optical axis and the lines of travel lie on a common plane.

These and other objects of the present invention will become apparent from the following detailed description.

BRIEF DESCRIPTIONS OF THE DRAWINGS

DETAILED DESCRIPTION OF THE INVENTION

Figure 1:
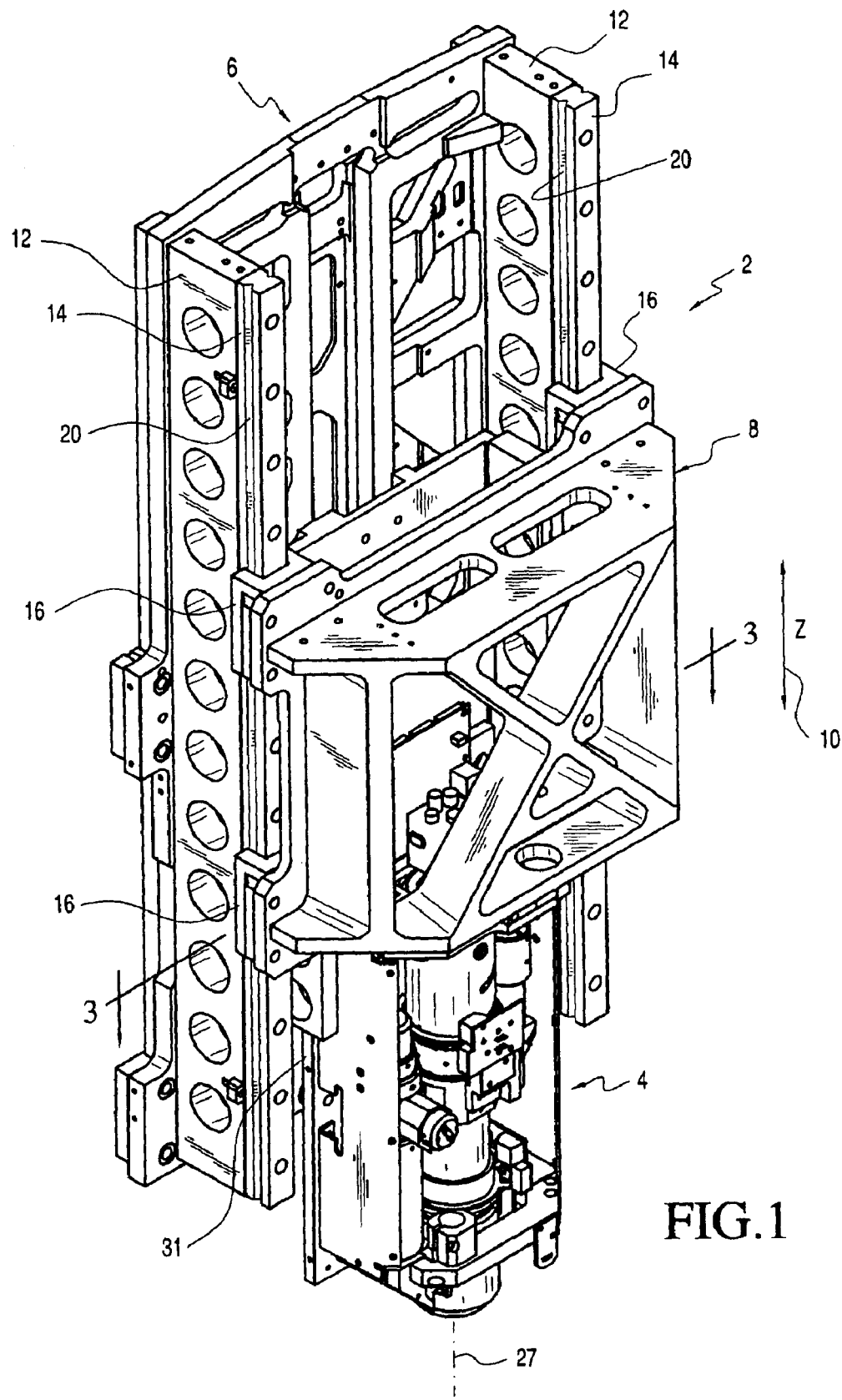
FIG. 1 is a perspective view of a Z-axis mount made in accordance with the present invention for a lens assembly in an optical inspection apparatus.
Figure 3:
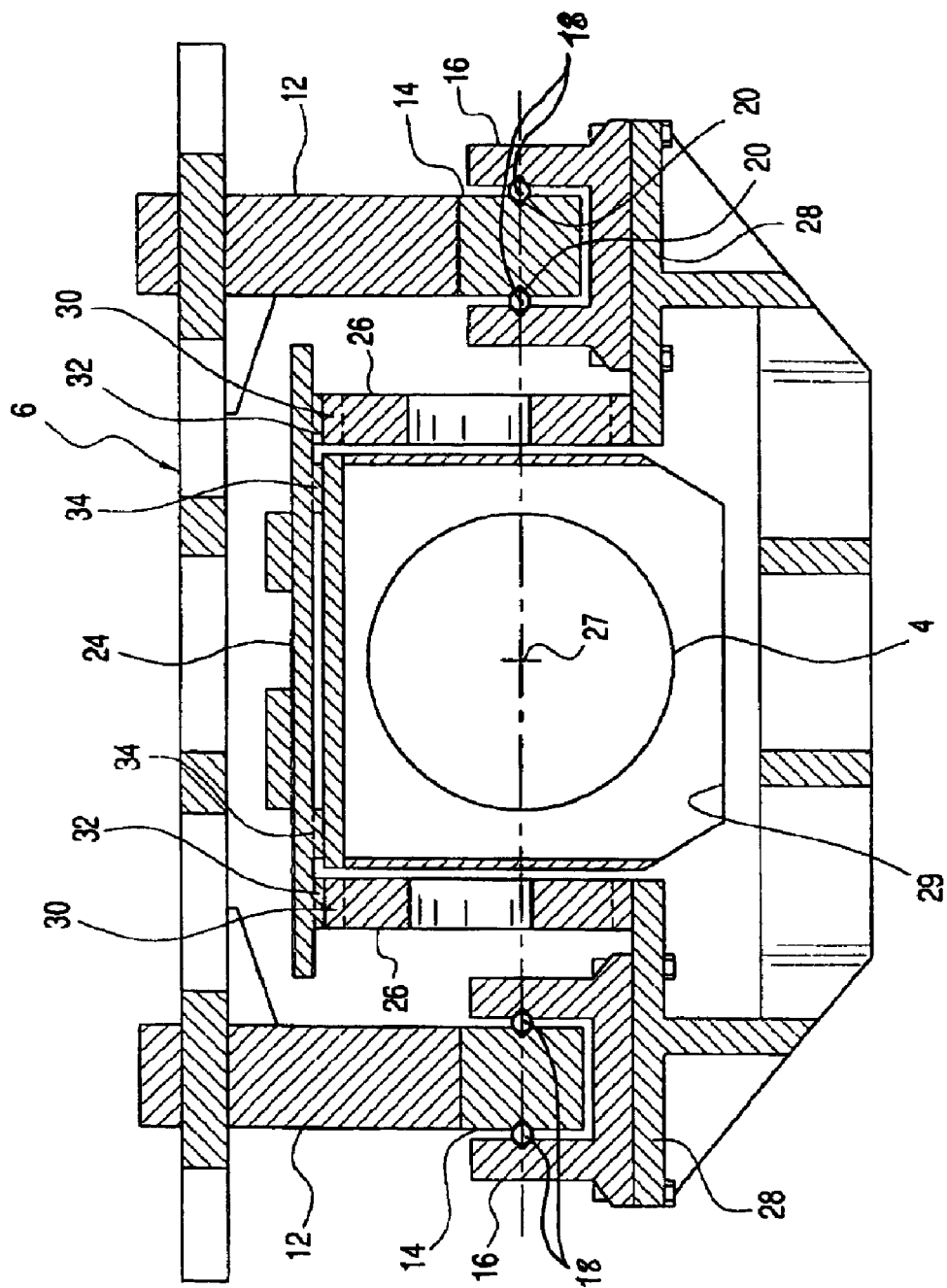
FIG. 3 is a cross-sectional view taken along line 3—3 of FIG. 1, showing the lens assembly schematically as a circle.

A Z-axis mount 2 made in accordance with the present invention for a lens assembly 4 is disclosed in FIG. 1. The mount 2 includes a base 6 and a support structure 8 constrained to move vertically along the Z-axis represented by the double-pointed arrow 10. The base 6 is substantially U-shaped in cross-section, having a pair of opposed parallel sidewalls 12. Parallel rails 14 are secured to respective outer edges of the sidewalls 12 by standard means, such as machine screws (not shown). A plurality of carriages 16 supported by recirculating ball bearings 18 (see FIG. 3) ride along the rails 14. The ball bearings ride along longitudinal guides, preferably V-shaped grooves 20, disposed on opposite sides of each rail (see FIG. 3). The ball bearings separately grip the rails 14 from opposite sides so that stresses are not transferred to the rest of the support structure 8. The rails 14 are precisely aligned parallel to one another. The rails 14 and carriages 16 are commercially available, for example, from NSK Precision America, Inc. Addison, Ill., and are known as precision linear guides. A discussion of linear guides is provided in Yabe, S, *Development of NSK Linear Guides*, Motion & Control No. 5—1998 NSK, incorporated herein by reference.

Figure 2:
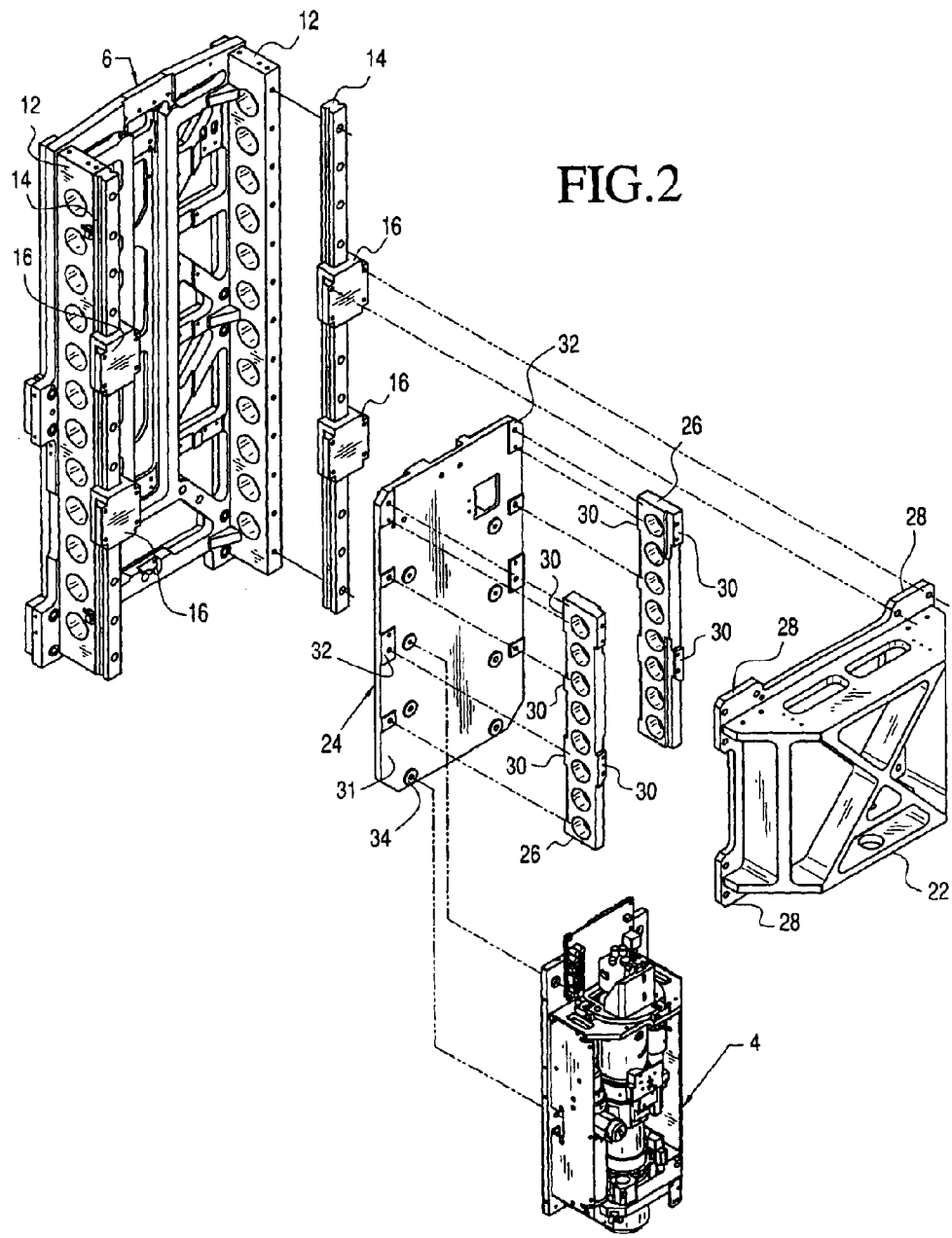
FIG. 2 is an assembly drawing of FIG. 1.

The support structure 8 is advantageously made in the form of a box structure, including a substantially open front frame 22, a rear plate 24 and a pair of opposed side members 26. The front frame 22 is secured to the carriages 16 at its respective four corner portions 28, as best shown in FIG. 2. The side members 26 are secured to the front frame 22 and the rear plate 24 to make a rigid and stiff overall structure.

The base 6 which supports the rails 14 and the carriages 16 has substantial depth, thereby increasing its moment of inertia and considerably reducing the deviation from straightness of the travel of the support structure 8. This level of straightness advantageously contributes to a very small Z-axis pitch error.

The cross-ribbed front frame 22 is mounted directly to the carriages 16 in the vertical plane of the Z-axis. The side members 26 are ground as a matched set to exacting tolerances to have parallel outer edges or contact points along their respective lengths and to one another. The side members 26 are used as stiffeners to constrain the front frame's four attachment corner portions 28 to the proper level of co-planarity to one another. The level of co-planarity between the attachment corners 28 contributes to a very small Z-axis roll error.

The cross-ribbed front frame 22, in conjunction with the parallel side members 26 and the rear plate 24 onto which the lens assembly 4 mounts, advantageously provide an extremely stiff box structure that provides an envelope around the lens assembly 4. The support structure 8 allows the optical axis 27 of the lens system 4 to be parallel and co-planar with the line of travel of the carriages 16 through the center of the ball bearings 18. The straightness and parallelism of the rails 14 and carriages 16 to each other contribute to a very small Z-axis yaw error.

Figure 4:
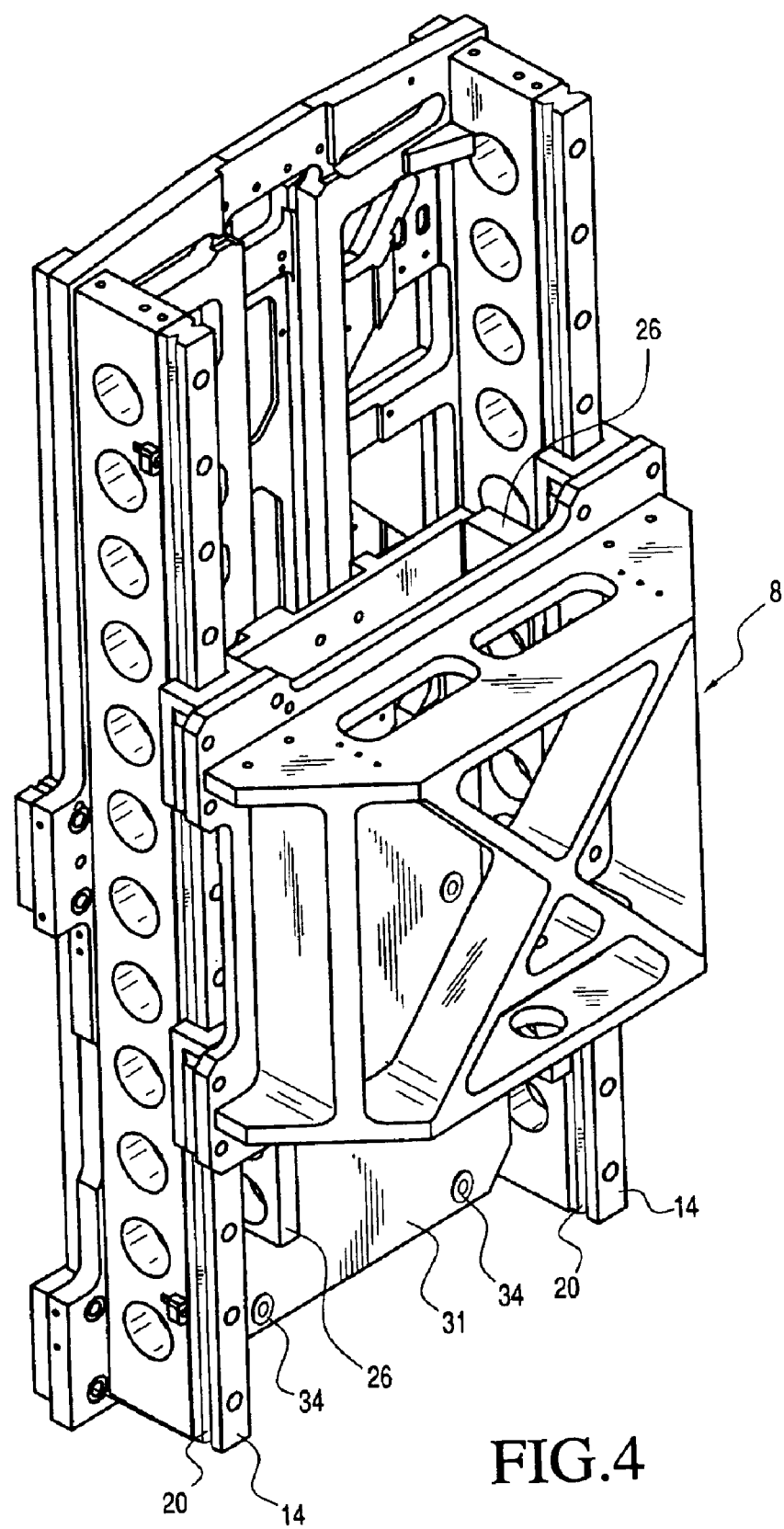
FIG. 4 is a perspective view similar to FIG. 1, but without the lens assembly.

The bottom of the front frame 22 has an opening 29 to allow the lens assembly 4 to be mounted to the rear plate 24. The front frame 22 is substantially open to advantageously provide full access to the lens assembly 4. In addition, the rear plate 24 has a bottom portion 31 that extends beyond the bottom of the front frame 22, as best shown in FIG. 4, to provide access to the bottom attachment surfaces 34 when securing the lens assembly 4 to the rear plate 24.

The support structure 8 advantageously provides minimal mass to stiffness ratio. This is afforded by the various holes drilled to the side members 26 and the open design of the cross-ribbed front frame 22 to provide a lower mass and the box-shaped support structure 8 that provides a stiff structure.

The attachment corner portions 28 of the front frame 22 have attachment surfaces relative to the carriages 16 that are ground to be co-planar to each other. The side members 26 has attachment portions 30 that are precision ground so that they are parallel to each other. The attachment portions 30 are raised relative to surrounding edge portions for greater accuracy in keeping the ground surfaces parallel to opposite surfaces and co-planar to the other surfaces lying on the same edge. The rear plate 24 also has raised attachment surfaces 32 that are ground to co-planarity. Raised attachment surfaces 34 onto which the lens assembly 4 is secured are also ground to a level of co-planarity.

The multiple carriages 16 are widely separated along each rail 14 and the rails themselves are also widely separated to advantageously provide a broad base support to greatly reduce the variables stresses and inaccuracies that would otherwise be larger for a closer spaced rails 14 and carriages 16. In addition, by having the optical axis 27 of the lens assembly 4 centrally located and substantially co-planar relative to axis of travel of the guiding bearings 18, the various errors relating to pitch, roll or yaw are reduced. Further, by having the bearings exert pressure on the respective rails from opposite sides and independently of the other rail, the side walls 12 are not squeezed with forces that could vary with the position of the support structure 8 along the Z-axis.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A Z-axis assembly for an optical inspection apparatus comprising:
   a base;
   first and second rails secured to said base, said first and second rails being parallel to each other;
   a plurality of carriages supported by ball bearings for translatory movement parallel to the Z-axis on each of said first and second rails, said ball bearings having contact points with respective of the first and second rails, the contact points lying on at least a first line of travel for carriages on one of the first and second rails and at least a second line of travel for carriages on the other of the first and second rails;
   a support structure secured to said carriages;
   a lens assembly secured to said support structure so as to be movable parallel to the Z-axis and said lines of travel, said lens assembly including an optical axis parallel to the Z-axis and said lines of travel, but spaced apart from the lines of travel so that said optical axis and all lines of travel lie on a common plane.

2. A Z-axis assembly as in claim 1, wherein:
   said base is U-shaped in cross-section including first and second upright walls; and
   said first and second rails are secured to respective first and second upright walls.

3. A Z-axis assembly as in claim 1, wherein said first and second rails include opposed longitudinal grooves along which said ball bearings travel.

4. A Z-axis assembly as in claim 1, wherein said carriages are U-shaped in cross-section.

5. A Z-axis assembly as in claim 1, wherein:
   said support structure is a box structure; and
   said lens assembly is disposed within said box structure.

6. A Z-axis assembly as in claim 5, wherein said box structure includes a front structure, a rear plate and first and second side members joined to said front structure and said rear plate.

7. A Z-axis assembly as in claim 6, wherein said front structure is joined to said carriages.

8. A Z-axis assembly as in claim 6, wherein said front structure is substantially open and cross-ribbed.

9. A Z-axis assembly as in claim 5, wherein said box structure is open at the bottom.

10. A Z-axis assembly as in claim 5, wherein said rear plate and said first and second side members form a U-shaped cross-section.

11. A Z-axis assembly as in claim 5, wherein said rear plate includes a bottom portion extending beyond a bottom portion of said front structure.

12. A Z-axis assembly as in claim 1, wherein said optical axis lies centrally between said line of travel of said carriages and coplanar with the lines of the bearing axis.

13. A Z-axis assembly for an optical inspection apparatus comprising:
   a base;
   first and second rails secured to said base, said first and second rails being parallel to each other;
   a plurality of carriages supported by ball bearings for translatory movement parallel to the Z-axis on each of said first and second rails, said carriages each having a line of travel through said ball bearings in contact with their respective rails;
   a box structure support secured to said carriages;
   said box structure support including a front structure, a rear plate and first and second side members joined to said front structure; and
   said rear plate providing a platform for supporting a component of the optical inspection system.

14. A Z-axis assembly as in claim 13, an further comprising a lens assembly secured to said rear plate, said lens assembly including an optical axis parallel to the Z-axis and said lines of travel, said optical axis and said lines of travel lying on a common plane.

15. A Z-axis assembly as in claim 13, wherein said optical axis lie centrally between said line of travel of said carriages.

16. A Z-axis assembly as in claim 13, wherein said rear plate includes a bottom portion extending beyond a bottom portion of said front structure.

17. An optical inspection apparatus Z-axis assembly comprising a base;

first and second rails secured to said base, said first and second rails being parallel to each other;

at least one carriage supported for translatory movement parallel to the Z-axis on each of said first and second rails, each at least one carriage having at least a first line of travel on a respective one of the first and second rails;

a support structure secured to said carriages for translation parallel to the Z-axis and all of the lines of travel; and a lens assembly secured to said support structure and including an optical axis parallel to the Z-axis and all of the lines of travel, the optical axis being spaced apart from the lines of travel so that the optical axis and all of the lines of travel lie on a common plane.

18. The assembly of claim 17 wherein each of the at least on carriage is supported on its respective rail by ball bearings.

19. The assembly of claim 18 wherein contact points of the ball bearings with a respective rail lie on a respective line of travel.

* * * * *